J. M. ABRAMS.
RESILIENT TIRE.
APPLICATION FILED OCT. 21, 1920.

1,401,948. Patented Jan. 3, 1922.

INVENTOR
John M. Abrams
BY
ATTORNEY

UNITED STATES PATENT OFFICE.

JOHN M. ABRAMS, OF BROOKLYN, NEW YORK.

RESILIENT TIRE.

1,401,948.  Specification of Letters Patent.  Patented Jan. 3, 1922.

Application filed October 21, 1920. Serial No. 418,380.

*To all whom it may concern:*

Be it known that I, JOHN M. ABRAMS, a citizen of the United States, and a resident of Brooklyn, New York, in the county of Kings and State of New York, have invented certain new and useful Improvements in Resilient Tires, of which the following is a specification.

The invention relates to a vehicle tire, more particularly to a tire possessing proper resiliency; and is composed of an outer rubber and fabric shoe or casing of the usual or special type, a metal substitute for the usual pneumatic tube and, if desired, an inner protector between the shoe and metal substitute. It has for its object to provide a tire which shall possess the advantages of the well-known pneumatic tire, yet have none of the disadvantages thereof. To this end, the invention consists in providing within the outer shoe or casing a continuous flexible metal member or band and, generally, a special intermediate protector, the metal member being so formed as to normally distend the said casing and protector and to reinforce same. This metal member will, of course, be puncture proof and is provided with integral, transversely directed spring arms to afford the desired resiliency to the tire. The invention comprehends, furthermore, means for suitably securing this metal resilient member to the rim portion of the wheel as well as for holding same within the shoe and locking the latter to the rim; also, to means for preventing the stretching of that portion of the elastic body of the tire which by weight and forward pull is forced just ahead of road contact.

The invention will best be understood when described in connection with the accompanying drawings, in which—

Similar characters of reference designate corresponding parts throughout the several views.

Figure 1:
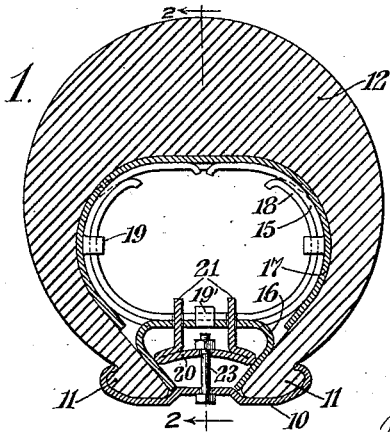
Fig. 1 is a transverse section through the tire and rim.
Figure 5:
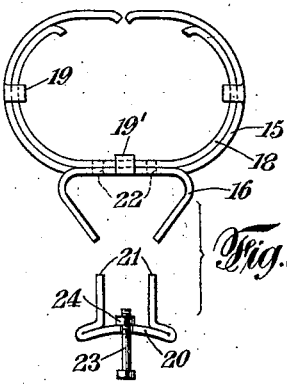
Fig. 5 is a detail view of the resilient metal member and the clamping means.

Referring to the drawings, 10 designates the rim of a vehicle wheel and is turned upwardly along the two outer edges to receive corresponding beads 11 of a shoe portion 12. The rim constitutes the tire supporting portion of a wheel and the said shoe may be of any well-known or special construction and suitably held to said rim.

Figure 2:
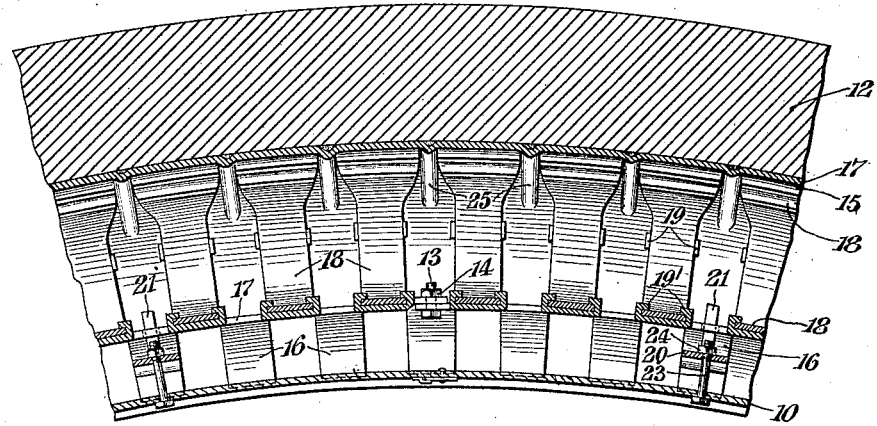
Fig. 2 is a longitudinal section taken along the line 2—2, Fig. 1.
Figure 4:
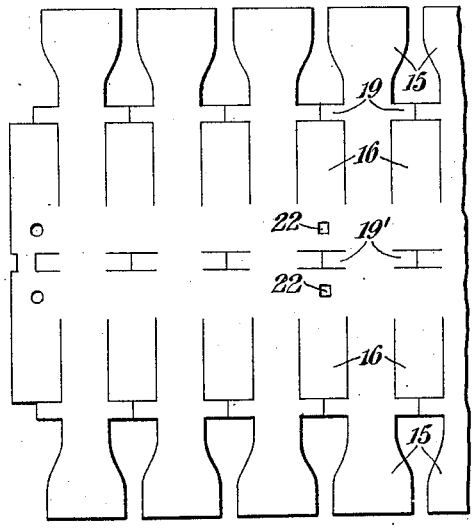
Fig. 4 is a development of the resilient metal members, or rather the blank as stamped to provide same.
Figure 3:
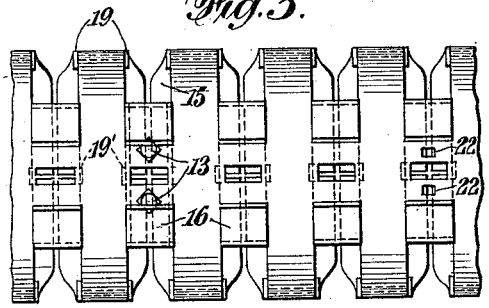
Fig. 3 is an underneath view of the cushioning means, the rim having been removed.

The usual pneumatic tube, employed in connection with a shoe in tires of this character, is dispensed with in the improved tire; and the same is replaced by a continuous metal filler member or band, circularly disposed within said casing and having its two ends secured as by means of suitable bolts and nuts 13 and 14, the latter being preferably permanently fixed to one of the ends, Figs. 2 and 3. Risers 15 and drops 16 are cut from this strip, as indicated more particularly in Fig. 4, being integral therewith and the former being turned outwardly and over said strip while the latter are turned inwardly and under said strip transversely of the shoe 12. The risers 15 are designed to substantially close over until their ends touch along the central portion, as shown in Fig. 1, contacting with the inner wall of the shoe or casing; or, preferably, with an intermediate protector 17 as of leather or composition and hereinafter more fully described. The drops 16 contact with the lower inner walls of said casing and are forced and held against same in manner hereinafter set forth. It is preferred to form these pairs of risers to provide a substantially elliptical reinforcing member and support for the shoe, possessing proper resiliency and whereby greatly increased mileage in the wear of the latter results. In addition to the risers 15, further inside or auxiliary risers 18 may be provided beyond the metal strip to occupy a portion of the risers 15; but the same do not extend entirely to the top of the latter. These auxiliary risers are individual pieces of metal which may be punched and separately formed, being held against displacement longitudinally of the tire by means of spurs 19 integral with the risers 15 and by further spurs 19′ extending outwardly from and over the strip. However, these inner leaves or auxiliary risers may be omitted if desired, thereby simplifying the construction and reducing the cost of the filler.

In order to positively lock the shoe to the rim, a locking or wedging member 20 is provided, the same being in the nature of an arched plate having extending arms 21 fitting corresponding openings 22 provided in the continuous metal filler member or band and its edges contacting with the sides of the drops 16. Means are provided to draw inwardly this arch plate 20 and thereby exert the necessary pressure against the sides of the drops 16 to force the beads 11 into the rim 10. To effect this result, a threaded bolt 23 extends outwardly through the rim 10 and the member 20, at intervals along the said rim which is raised in the center portion to avoid interference of the head of the bolt with the top of the felly of the wheel. On this bolt works a threaded nut 24 which is welded to the said arch plate. It will be understood that by rotating the said bolt in the proper direction, pressure may be exerted on the arch plate to draw same inwardly and thereby obtain the desired pressure upon the drops 16. The pressure transmitted to drops 16 and sides of the shoe serves thus to spread the drops and force the beads 11 of the shoe securely into the turned rim portions and insure the holding by same of the tire. Moreover, in the use of the protector 17 it is preferred to indent same over a portion transversely to the tire and to fill the indentations with some suitable material as a cement, serving when dry and hard to form permanent bulges 25 in the protector between the risers 15 and to cause said protector to adhere to the shoe. Furthermore, by this expedient stretching is prevented of that portion of the elastic body of the tire which by weight and forward pull is forced just ahead of road contact since the tire, when in motion, is continually rolling up hill.

I claim:—

1. In a vehicle tire: the combination with a rim and a shoe or casing carried by same; of a continuous metal member extending throughout the interior of said casing and having risers and drops integral therewith, extending respectively outwardly and over same and inwardly and under same.

2. In a vehicle tire: the combination with a rim and a shoe or casing carried by same; of a continuous metal member extending throughout the interior of said casing and having risers and drops integral therewith, extending respectively outwardly and over same and inwardly and under same transversely of the casing.

3. In a vehicle tire: the combination with a rim and a shoe or casing carried by same; of a continuous metal member extending throughout the interior of said casing and having risers and drops integral therewith, said risers each formed substantially as an ellipse and the risers and drops extending respectively outwardly and over the metal member and inwardly and under same and transversely of the casing.

4. In a vehicle tire: the combination with a rim and a shoe or casing carried by same; of a continuous metal member extending throughout the interior of said casing and having risers and drops integral therewith, said risers each formed substantially as an ellipse and the risers and drops extending respectively outwardly and over the metal member and inwardly and under same transversely of the casing; and an auxiliary riser extending over a portion of each of the said risers and secured thereto.

5. In a vehicle tire: the combination with a rim and a shoe or casing carried by same; of a continuous metal member extending throughout the interior of said casing and having risers and drops integral therewith, extending respectively outwardly and over the metal member and inwardly and under same transversely of the casing; and means to exert pressure against a number of said drops to secure the shoe to the rim.

6. In a vehicle tire: the combination with a rim and a shoe or casing carried by same; of a continuous metal member extending throughout the interior of said casing and having risers and drops integral therewith, extending respectively outwardly and over the metal member and inwardly and under same transversely of the casing; a plurality of plates each having its edges contacting with a pair of drops; and means to draw said plates inwardly.

7. In a vehicle tire: the combination with a rim and a shoe or casing carried by same; of a continuous metal member extending throughout the interior of said casing and having risers and drops integral therewith, extending respectively outwardly and over the metal member and inwardly and under same transversely of the casing; a plurality of arch plates each having its edges contacting with a pair of drops; threaded bolts passing through said rim and having heads at the inner ends contacting with the inner face of the rim; and nuts working on said bolts and engaging the arch plates to draw same inwardly.

8. In a vehicle tire: the combination with a rim being raised at the central portion longitudinally of same, and a shoe or casing carried by said rim; of a continuous metal member extending throughout the interior of said casing and having risers and drops integral therewith, extending respectively outwardly and over the metal member and inwardly and under same transversely of the casing; a plurality of arch plates each having its edges contacting with a pair of drops; threaded bolts passing through said rim and having heads at the inner ends contacting with the face of the longitudinally raised portion of the rim; and nuts working on said bolts and engaging the arch plates to draw same inwardly.

9. In a vehicle tire: the combination with a rim of a wheel, and a shoe or casing carried by same; of a continuous metal member extending throughout the interior of said casing and having risers and drops integral therewith, extending respectively outwardly and over said metal member and inwardly and under same transversely of the casing; and means to exert pressure against a number of said drops to force the inner edges of the shoe or casing against the rim.

10. In a vehicle tire: the combination with a rim and a shoe or casing carried by same; of a continuous metal member extending throughout the interior of said casing and having risers and drops integral therewith, extending respectively outwardly and over same and inwardly and under same; and auxiliary risers within said risers and secured thereto.

11. In a vehicle tire: the combination with a rim and a shoe or casing carried by same; of a continuous metal member extending throughout the interior of said casing and having risers and drops integral therewith, extending respectively outwardly and over same and inwardly and under same; and auxiliary risers within said risers, extending over a portion of same and secured thereto.

12. In a vehicle tire: the combination with a rim and a shoe or casing carried by same; of a continuous metal member extending throughout the interior of said casing and having risers and drops integral therewith, extending respectively outwardly and over same and inwardly and under same; and a protector member between said risers and casing.

13. In a vehicle tire: the combination with a rim and a shoe or casing carried by same; of a continuous metal member extending throughout the interior of said casing and having risers and drops integral therewith, extending respectively outwardly and over same and inwardly and under same; and a protector member between said risers and casing, having indentations along same transversely of the casing.

14. In a vehicle tire: the combination with a rim and a shoe or casing carried by same; of a continuous metal member extending throughout the interior of said casing and having risers and drops integral therewith, extending respectively outwardly and over same and inwardly and under same; and a protector member between said risers and casing having indentations along same transversely of the casing, and filling material within said indentations.

15. In a vehicle tire: the combination with a rim and a shoe or casing carried by same; of a continuous metal member extending throughout the interior of said casing and having risers and drops integral therewith, extending respectively outwardly and over same and inwardly and under same; and a protector member between said risers and casing having indentations along same transversely of the casing, and adhesive filling material within said indentations.

16. In a vehicle tire: the combination with a rim and a shoe or casing carried by same; of a continuous metal member extending throughout the interior of said casing and having risers and drops extending respectively outwardly and over same and inwardly and under same transversely of the casing; and means to exert pressure against a number of said drops to secure the shoe to the rim.

17. In a vehicle tire: the combination with a rim and a shoe or casing carried by same; of a continuous metal member extending throughout the interior of said casing and having risers and drops extending respectively outwardly and over same and inwardly and under same; and auxiliary risers within said risers and secured thereto.

18. In a vehicle tire: the combination with a rim and a shoe or casing carried by same; of a continuous metal member extending throughout the interior of said casing and having risers and drops extending respectively outwardly and over same and inwardly and under same; and a protector member between said risers and casing.

19. In a vehicle tire: the combination with a rim and a shoe or casing carried by same; of a continuous metal member extending throughout the interior of said casing and having risers and drops extending respectively outwardly and over same and inwardly and under same; and a protector member between said risers and casing, having indentations along same transversely of the casing.

20. In a vehicle tire: the combination with a rim and a shoe or casing carried by same; of a continuous metal member extending throughout the interior of said casing and having risers and drops extending respectively outwardly and over same and inwardly and under same; and a protector member between said risers and casing having indentations along same transversely of the casing and filling material within said indentations.

Signed at Brooklyn in the county of Kings and State of New York this 19th day of October A. D. 1920.

JOHN M. ABRAMS.